US007894799B2

(12) United States Patent
Kim

(10) Patent No.: US 7,894,799 B2
(45) Date of Patent: Feb. 22, 2011

(54) SYSTEM AND METHOD FOR SELECTIVELY RECEIVING DIGITAL MULTIMEDIA BROADCASTING (DMB) DATA BROADCAST

(75) Inventor: Hyung-Jun Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1417 days.

(21) Appl. No.: 11/348,747

(22) Filed: Feb. 7, 2006

(65) Prior Publication Data

US 2006/0178105 A1 Aug. 10, 2006

(30) Foreign Application Priority Data

Feb. 7, 2005 (KR) ..................... 10-2005-0011200

(51) Int. Cl.
*H04M 3/42* (2006.01)

(52) U.S. Cl. .............. 455/414.1; 455/552.1; 455/426.1; 455/414.4; 455/412.1; 455/412.2; 709/219; 709/227; 725/62; 725/109; 725/110; 725/111; 725/123

(58) Field of Classification Search .............. 455/426.1, 455/552.1, 414.1, 414.4, 412.1, 412.2; 709/219, 709/227; 725/62, 63, 109–112, 121–123
See application file for complete search history.

(56) References Cited

U.S. PATENT DOCUMENTS 6,728,300 B1 * 4/2004 Sarkar et al. ................ 375/147
2003/0177142 A1 * 9/2003 Ferris ...................... 707/104.1
2004/0064507 A1 * 4/2004 Sakata ........................ 709/205
2006/0105787 A1 * 5/2006 Seo ......................... 455/456.5
2008/0133130 A1 * 6/2008 Okamoto .................... 701/209

FOREIGN PATENT DOCUMENTS

WO WO 03/045064 5/2003

OTHER PUBLICATIONS

Sammo Cho et al., An Efficient Transmission of Traffic and Traveler Information Using Digital Multimedia Broadcasting Network, 2005.
D. Kopitz et al., Traffic and Travel Information Broadcasting—Protocols for the 21st Century, 1999.

* cited by examiner

*Primary Examiner*—Wayne Cai
(74) *Attorney, Agent, or Firm*—The Farrell Law Firm, P.C.

(57) ABSTRACT

A method and system includes a terminal having a function of receiving a DMB data broadcast, a service network information (SNI) application management server that transmits SNI to the mobile communication terminal in response to a request from the mobile communication terminal, a data broadcast server that provides information regarding the DMB data broadcast, a DMB transmitting station that transmits the information regarding the DMB data broadcast, and a Transport Protocol Experts Group (TPEG) service provider that provides the SNI to the SNI management server, and data broadcast information including the SNI to the data broadcast server. The mobile communication terminal receives the SNI from the SNI management server via a cellular network to determine the time when a user's desired data broadcast starts, and receives a data broadcast from the DMB transmitting station only at that time.

10 Claims, 8 Drawing Sheets

| Table 1 | Fast Tuning GST (Guide to the Service Table)<br>Version Number :<br>Range: 0..255, Incremented, if any of the entries is changed, Type: <intunti><br>Character Table Identifier:<br>Default character table for the current service, Type: <chartab> | | | | | |
|---|---|---|---|---|---|---|
| | 1 | 2 | | | 3 | 4 |
| Name: | Service Component Identification (SCID): | Application and Content Identifier (ACID): | | | Next operating time: | Encryption Indicator: |
| | | Originator Service Identification: (SID-A, SID-B, SID-C) | Content Identification: (COID) | Application Identification: (AID) | | |
| Transmission: | Mandatory | Optional | Mandatory | Mandatory | Optional | Optional |
| Default: | | Carrier Service Identification, because the content originates from the carrier | | | From the year 1970 to 2106 | 0 = Non encrypted |
| Element Structure: | <intunti> 1 Byte | 3* <intunti> 3 Bytes | <intunti> 1 Byte | <intunti> 2 Bytes | <optime> 8 Bytes | <intunti> 1 Byte |

FIG.2A

| Table 2 | Time Schedule GST (Guide to the Service Table)<br>Version Number :<br>Range: 0..255, Incremented, if any of the entries is changed, Type: <intunti> | |
|---|---|---|
| | 1 | 2 |
| Name: | Service Component Identification (SCID): | Operating Time: |
| Transmission: | Mandatory (if operating time exists) | Mandatory (if operating time exists) |
| Element Structure: | <intunti><br>1 Byte | <time_slot>:=<br><app_start_time>,<br><duration>;<br>11 Bytes<br>Explanation: Indicates the start time, the repetition and the duration of any SCID |

FIG.2B

SYSTEM AND METHOD FOR SELECTIVELY RECEIVING DIGITAL MULTIMEDIA BROADCASTING (DMB) DATA BROADCAST

PRIORITY

This application claims priority to an application entitled "System and Method for Selectively Receiving Digital Multimedia Broadcasting (DMB) Data Broadcast", filed in the Korean Industrial Property Office on Feb. 7, 2005 and assigned Serial No. 2005-11200, the contents of which are incorporated herein by reference.

BACKGROUND OF THE INVENTION

1. Field of the Invention

The present invention relates generally to a system and method for receiving digital multimedia broadcasting (DMB) data broadcast, and more particularly to a system and method for selectively receiving information desired by a user from DMB data broadcast.

2. Description of the Related Art

Information services, such as a traffic information service, a travel information service, and a weather information service, are provided through a terrestrial DMB data broadcast according to the Transport Protocol Experts Group (TPEG) standard.

A DMB receiver is required to receive such services. There are various types of DMB receivers, e.g. a terminal or a telephone for exclusively receiving a DMB data broadcast or a multifunctional terminal such as a telematics system.

However, terminals for receiving a terrestrial DMB data broadcast continuously receive data broadcasts, store them in a memory, and access the memory to detect and display desired information as per a user's request.

A terminal installed in a vehicle, for example, or having a large capacity of memory, is stably given a large amount of power, and thus, the performance of the terminal is not greatly affected by continuously receiving a series of data broadcasts and storing them in the memory. In contrast, the performance of a terminal, such as a mobile phone using a rechargeable battery, which functions with a limited amount of power, is significantly limited in this case. Also, the mobile phone requires a large amount of power, not only to receive data broadcast services, but also to perform mobile phone functions. Therefore, when a great quantity of power is consumed to receive a series of data broadcasts, the mobile phone may not be able to perform basic functions. Furthermore, when a user desires specific information regarding a data broadcast service, a great amount of time is required to obtain the desired information since all of the information regarding the data broadcast service must be received after the mobile phone begins to work.

SUMMARY OF THE INVENTION

Accordingly, the present invention has been designed to solve the above and other problems occurring in the prior art, and an object of the present invention is to provide a system and method for selectively receiving desired data broadcast information from a DMB data broadcast.

In order to accomplish the above and other objects, there is provided a system for selectively receiving a multimedia broadcasting (DMB) data broadcast, which includes a mobile communication terminal having a function of receiving the DMB data broadcast; a service network information (SNI) application management server transmitting SNI to the mobile communication terminal in response to a request from the mobile communication terminal; a data broadcast server providing data broadcast information of the DMB; a DMB transmitting station transmitting the data broadcast information of the DMB; and a Transport Protocol Experts Group (TPEG) service provider transmitting the SNI to the SNI management server, and data broadcast information including the SNI to the data broadcast server. The mobile communication terminal receives the SNI from the SNI management server via a cellular network to determine the time when a desired service data broadcast starts, and receives a data broadcast from the DMB transmitting station only at that time.

In accordance with another aspect of the present invention, there is provided a system for selectively receiving a digital multimedia broadcasting (DMB) data broadcast, which includes transmitting a keyword or a category of a user's desired service data broadcast to a service network information (SNI) application management server via a cellular network; the SNI management server providing a mobile communication terminal with SNI corresponding to the keyword or the category from SNI received from a Transport Protocol Experts Group (TPEG) service provider via a cellular network; and the mobile communication terminal analyzing the SNI to determine the time when the service data broadcast starts, and receiving the data broadcast only at that time.

BRIEF DESCRIPTION OF THE DRAWINGS

The above and other objects, features and advantages of the present invention will be more apparent from the following detailed description taken in conjunction with the accompanying drawings, in which:

FIG. 2A illustrates the construction of a first service table, which is one of the constituent elements of Transport Protocol Experts Group (TPEG)-service network information (SNI) application, for fast tuning;

FIG. 2B illustrates the construction of a second service table, which is one of constituent elements of the TPEG-SNI, for a time plan;

DETAILED DESCRIPTION OF THE PREFERRED EMBODIMENTS

Preferred embodiments of the present invention will be described in detail hereinafter with reference to the accompanying drawings. In this disclosure, specific matters, such as particular traffic, travel, or weather information services, are exemplified for better understanding of the present invention, but it would be apparent to those of ordinary skill in the art that the present invention can be accomplished without the above specific matters.

The present invention proposes an apparatus and method for acquiring the minimum amount of information required to receive only a desired terrestrial DMB data broadcast via a cellular network, using a mobile communication terminal capable of receiving terrestrial DMB services and accessing the cellular network. That is, according to the present invention, the time when the desired data broadcast is broadcasted is learned beforehand, and the broadcast is received only at that time, rather than continuously receiving data broadcasts. The content of a broadcast and information regarding the running time thereof can be obtained by receiving and analyzing service network information (SNI) application according to the Transport Protocol Experts Group (TPEG) standard, using a mobile communication terminal, such as a mobile phone, capable of accessing the cellular network.

Figure 1:
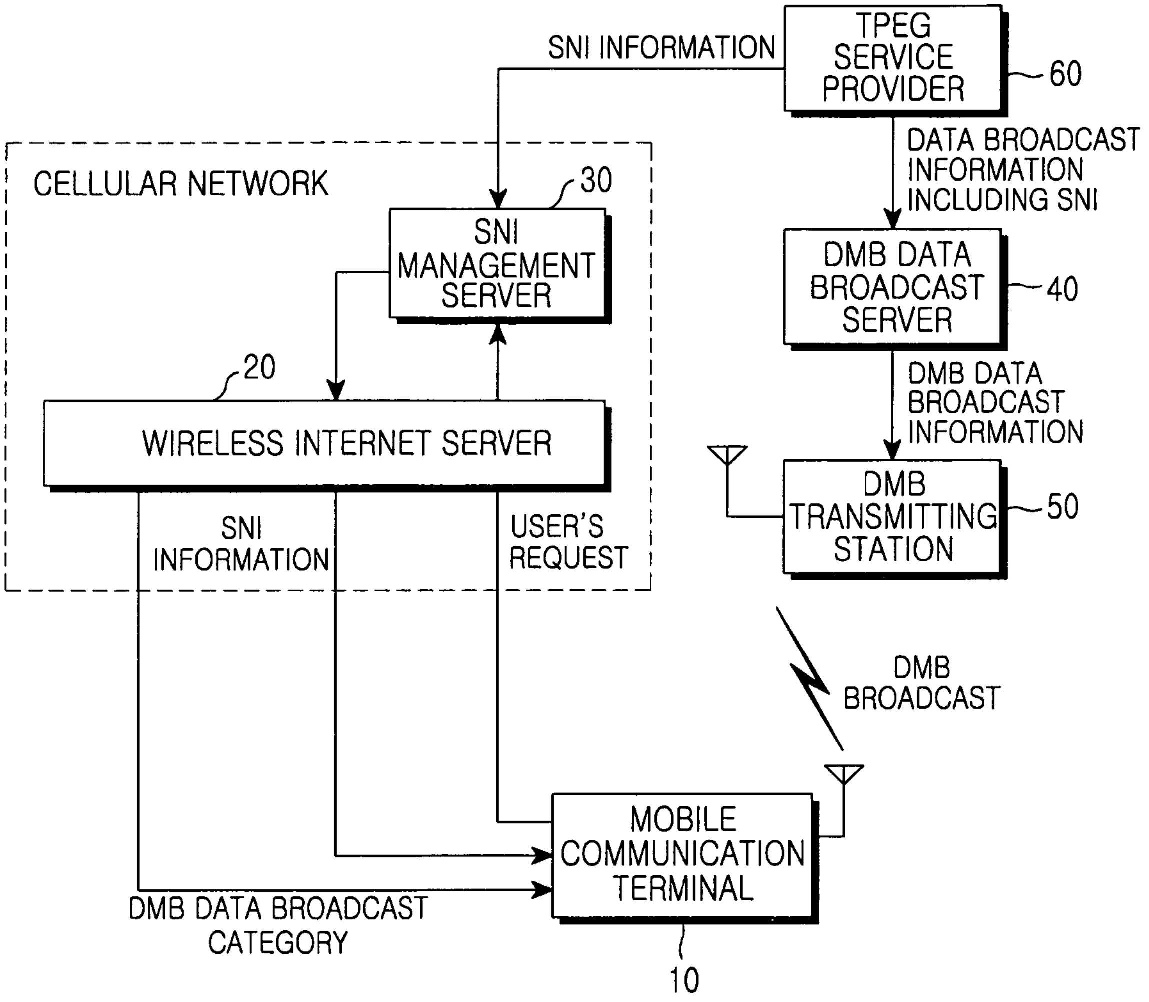
FIG. 1 is a block diagram illustrating a system for selectively receiving a DMB data broadcast according to a preferred embodiment of the present invention.

FIG. 1 is a block diagram illustrating a system for selectively receiving a DMB data broadcast according to a preferred embodiment of the present invention.

In FIG. 1, a mobile communication terminal 10 may be embodied as a terminal for exclusively receiving DMB data broadcasts, or a multi-functional communication terminal having at least one further function. That is, the mobile communication terminal 10 may be any terminal, such as a personal data assistant (PDA), a cellular phone, or a telematics terminal, which has a function of receiving DMB data broadcasts. A wireless Internet server 20 provides DMB categories to the mobile communication terminal 10. An SNI management server 30 provides SNI to the mobile communication terminal 10 via the wireless Internet server 20. A DMB broadcast server 40 provides DMB data broadcast information. A DMB transmitting station 50 transmits the DMB data broadcast information. A TPEG service provider 60 provides the SNI management server 30 with SNI of TPEG information. Also, the TPEG service provider 60 provides the DMB broadcast server 40 with data broadcast information that contains the SNI. The TPEG service provider 60 is a TPEG application server, such as a traffic information storage device.

The mobile communication terminal 10 requests the SNI management server 30 to provide information directly or via the wireless Internet server 20. Also, the mobile communication terminal 10 analyzes the SNI to determine the time when the corresponding DMB data broadcast starts, enters a sleep mode or switches off a DMB module (not shown), and then enters a wake-up mode or switches on the DMB module to receive the DMB data broadcast when the DMB data broadcast starts.

To obtain information regarding a desired data broadcast service from DMB data broadcasts, a user requests the SNI management server 30 to provide the information. In this case, the user may access the wireless Internet server 20 using the mobile communication terminal 10 to access the SNI management server 30, or may directly access the SNI management server 30. Examples of the method of accessing the SNI management server 30 are as follows.

First, the mobile communication terminal 10 transmits the category of a DMB data broadcast (TPEG application category) directly to the SNI management server 30. In this case, the mobile communication terminal 10 has a category database, and when the user selects one of the categories stored in the database, the selected category is transmitted to the SNI management server 30. The category may be, for example, a road traffic message (RTM) application.

Second, an Internet server or the mobile communication terminal 10 transmits a keyword from among predetermined keywords, which is selected by the user, to the SNI management server 30. In this case, the Internet server or the mobile communication terminal 10 has a keyword database, and when the user selects one of keywords stored in the keyword database, the selected keyword is transmitted to the SNI management server 30. The keyword may be, for example, traffic information or expressway traffic information. In the case of using a keyword database of the Internet server, the user accesses a related Internet portal site via the mobile communication terminal 10 and selects a keyword. Then, the Internet server transmits the selected keyword to the SNI management server 30, or the mobile communication terminal 10 transmits it to the SNI management server 30.

Third, the mobile communication terminal 10 transmits a keyword input by the user. In this case, since the user inputs the keyword, the mobile communication terminal 10 does not have a keyword database. The keyword may be traffic information of a particular city or area.

Upon receiving the user's request for a category or a keyword, for example, through one of the above methods, the SNI management server 30 transmits SNI to the mobile communication terminal 10 of the user. Otherwise, if the SNI or itemized services cannot be provided due to the absence of a keyword, or because when no information regarding the keyword is extracted from a category which is estimated to be related to the keyword, the SNI management server 30 may transmit a message informing this fact to the mobile communication terminal 10.

The SNI management server 30 receives SNI regarding various services from the TPEG service provider 60. Then, the SNI management server 30 detects a service (a traffic jam alarm service, etc.) corresponding to a keyword or a category regarding traffic information, which the user inputs or selects, and transmits only SNI regarding the detected service to the mobile communication terminal 10 via the cellular network.

FIG. 1 shows the SNI management server 30 included in the cellular network, but the location of the SNI management server 30 is not so limited so long as it can be connected to the cellular network.

FIG. 2A illustrates the construction of a first service table GST1, which is information constituting TPEG-SNI, for fast tuning. FIG. 2B illustrates the construction of a second service table GST2, which is information constituting the TPEG-SNI, for a time plan.

The TPEG standard has been disclosed in "TPEG Specification—Part 3: Service and Network Information Application TPEG-SNI_3.0/002", pp. 26-29, 8 Oct. 2002. The TPEG standard proposes five service tables. In general, only a first service table of the five service tables is periodically provided. For convenience of explanation, only two service tables of the five service tables are illustrated in FIGS. 2A and 2B. The first service table shown in FIG. 2A presents the definition of basic data services and an outline of content that must be transmitted to a user. The other four tables present additional information and thus are selectively provided if required. For instance, in the case of a broadcast such as a traffic information broadcast, which must be periodically transmitted, according to the present invention, a term "Next operating time" presented in the first service table of FIG. 2A is used. If the second service table is also provided, both the term "Next operating time," and a term "Duration" specifying a repetition cycle of a current broadcast service can be used. However, since the second service table is not periodically received, if the time when a data broadcast of the user's desired service is to be transmitted can be learned beforehand, there is no need to acquire additional information regarding the time when the data broadcast will be repeated from the repetition cycle for a wake-up.

Figure 3:
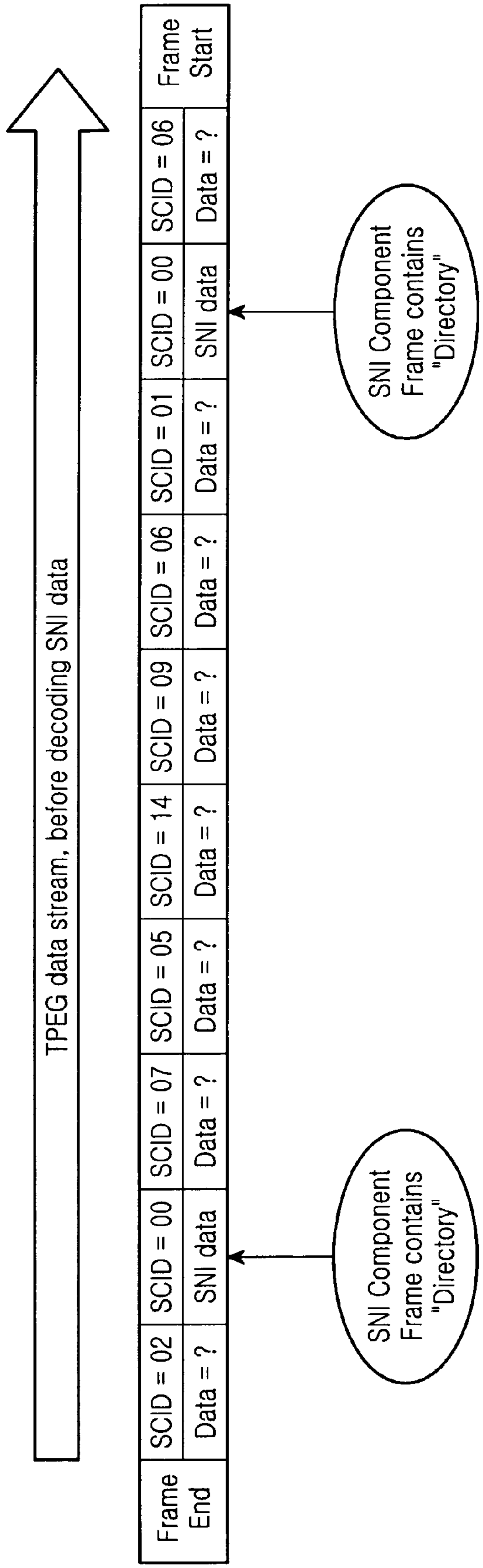
FIG. 3 illustrates the construction of a TPEG data stream that can be recognized by a mobile communication terminal before SNI data is decoded.
Figure 4:
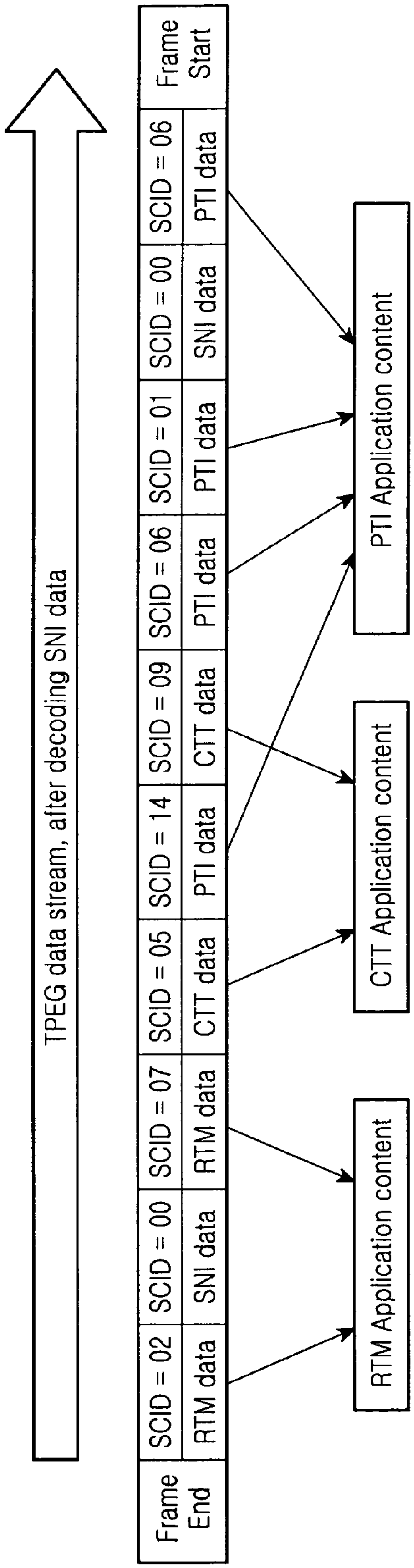
FIG. 4 illustrates the construction of a TPEG data stream that can be recognized by a mobile communication terminal after SNI data is decoded.

FIG. 3 illustrates the construction of a TPEG data stream that the mobile communication terminal 10 can recognize, before SNI data is decoded. FIG. 4 illustrates the construction of a TPEG data stream that the mobile communication terminal 10 can recognize, after SNI data is decoded.

Referring to FIGS. 2-4, the TPEG data stream presents that various data broadcast information is included in a service frame to be continuously transmitted. The information regarding a low-rank service can be confirmed by reading SNI in the service frame. The SNI contains a Guide to the Service Tables (GST) that specifies service component identification (SCID), application content (ACID), next operating time, encrypted indicator information, etc. From the GST, a currently broadcast application is confirmed, and the information regarding content in the current application is read to determine time when the content is provided.

For instance, if a user desires to receive a traffic information service, to receive the RTM information, the mobile communication terminal 10 first detects SNI data while receiving a data broadcast. As described above, the SCID of the SNI is "0" and the time when the SNI is to be received have already been disclosed to the mobile communication terminal 10 via a cellular network. When the SNI data is detected, the detected SNI data is decoded to determine the other SCIDs.

In the TPEG data stream of FIG. 3, "SCID=00" denotes "SNI data," and the other SCIDs denote "Data=?" which means the data corresponding to the other SCIDs have yet to be decoded.

In FIG. 4, "SCID=02" and "SCID=07" denote "RTM data," that is, the types of data corresponding thereto are determined by decoding the SNI data. The RTM data corresponding to "SCID=02" and "SCID=07" is decoded to obtain desired traffic information.

After receiving the desired data broadcast, the next operating time of the data broadcast is confirmed, and then it is determined whether a DMB module will be used until a subsequent data broadcast is received, a DMB sleep mode will be initiated, or the DMB module will be switched off, according to the confirming result. Here, the "next operating time" indicates the time when the user's desired service data broadcast is transmitted again. In this case, the service data broadcast may be repeatedly transmitted or an entry thereof may be modified. For instance, if a data broadcast of a traffic information service is currently being received, the content of the data broadcast may be different from that of a subsequent data broadcast thereof according to the time or a traffic situation.

Figure 5:
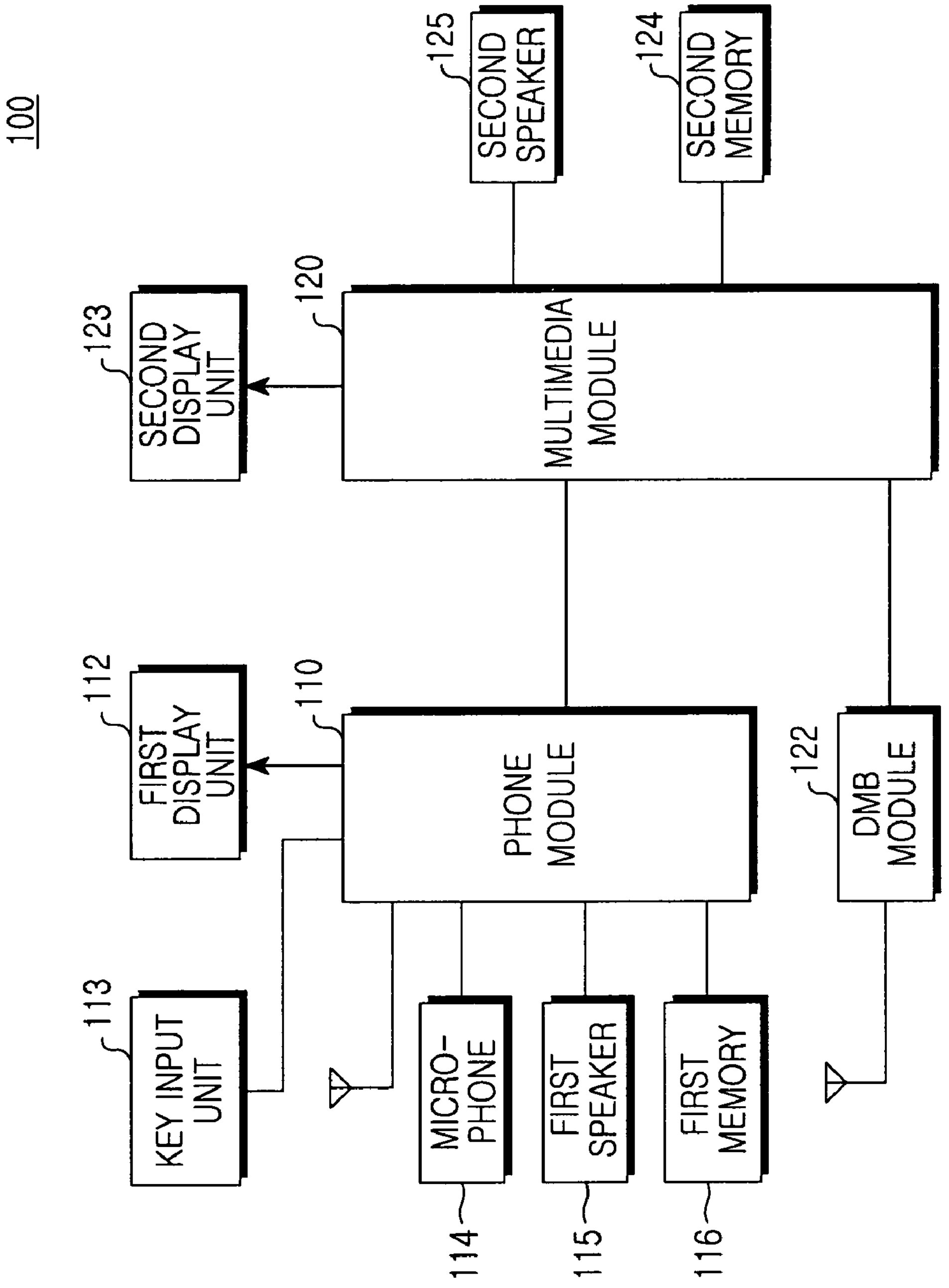
FIG. 5 is a block diagram illustrating the construction of a mobile communication terminal capable of receiving a DMB data broadcast, according to an embodiment of the present invention.

FIG. 5 is a block diagram illustrating the construction of a mobile communication terminal capable of receiving DMB services according to a preferred embodiment of the present invention.

The mobile communication terminal of FIG. 5 is a DMB receiving mobile phone which is another example of the mobile communication terminal 10 of FIG. 1. The mobile communication terminal of FIG. 5 includes a mobile phone module 110 that has a mobile phone control function, a DMB module 122 that receives broadcasts, and a multimedia module 120 that has a multimedia control function. The phone module 110 controls a first display unit 112, a key input unit 113, a microphone 114, a first speaker 115, and a first memory 116. The multimedia module 120 controls a second display unit 123, a second speaker 125, and a second memory 124.

Specifically, the phone module 110 is comprised of a radio frequency (RF) transmitting and receiving part and a modem chip part, e.g. QualComm's mobile station modem (MSM) 5500, and transmits and receives communication signals, and controls the overall functions of the mobile communication terminal 10 having a mobile phone function. The first display unit 112 displays information regarding the overall functions of the mobile communication terminal 10. The key input unit 113 receives a user's input of control commands or data. The microphone 114 receives audio signals. The first speaker 115 outputs audio signals containing call voice, for example, regarding performing of mobile phone functions. The first memory 116 stores the information regarding the overall functions of the mobile communication terminal 10.

The DMB module 122 receives DMB RF signals via an antenna and a demodulator. However, since the construction of the DMB module 122 does not fall within the subject matter of the present invention, it is not illustrated in greater detail in the drawings.

The multimedia module 120 decodes DMB data received from the DMB module 122 and outputs the decoding result as multimedia information (video, text (data), audio, etc.) to be provided to the user. The multimedia module 120 receives SNI via a cellular network, analyzes the SNI to learn the time when a broadcast starts, enters a sleep mode or switches off the DMB module 122, and enters a wake-up mode or switches on the DMB module 122 at the broadcast start time.

The second display unit 123 displays a video signal received from the multimedia module 120. The second speaker 125 outputs an audio signal received from the multimedia module 120. The second memory 124 stores information regarding DMB services. In this embodiment, a DMB data broadcast category or a keyword database may be stored in the second memory 124.

The second speaker 125 and the second display unit 123 are DMB outputting interface units, and thus, one of them may be omitted according to the type of a DMB. For instance, when only a digital data broadcast is provided, only the second display unit 123 may be installed as a DMB outputting interface unit.

The first and second speakers 115 and 125, and the first and second display units 112 and 123 may be separately constructed by hardware as illustrated in FIG. 5, or may be constructed as a speaker and a display unit, respectively. Also, the multimedia module 120 may be an H.264 codec multimedia processor.

Figure 6:
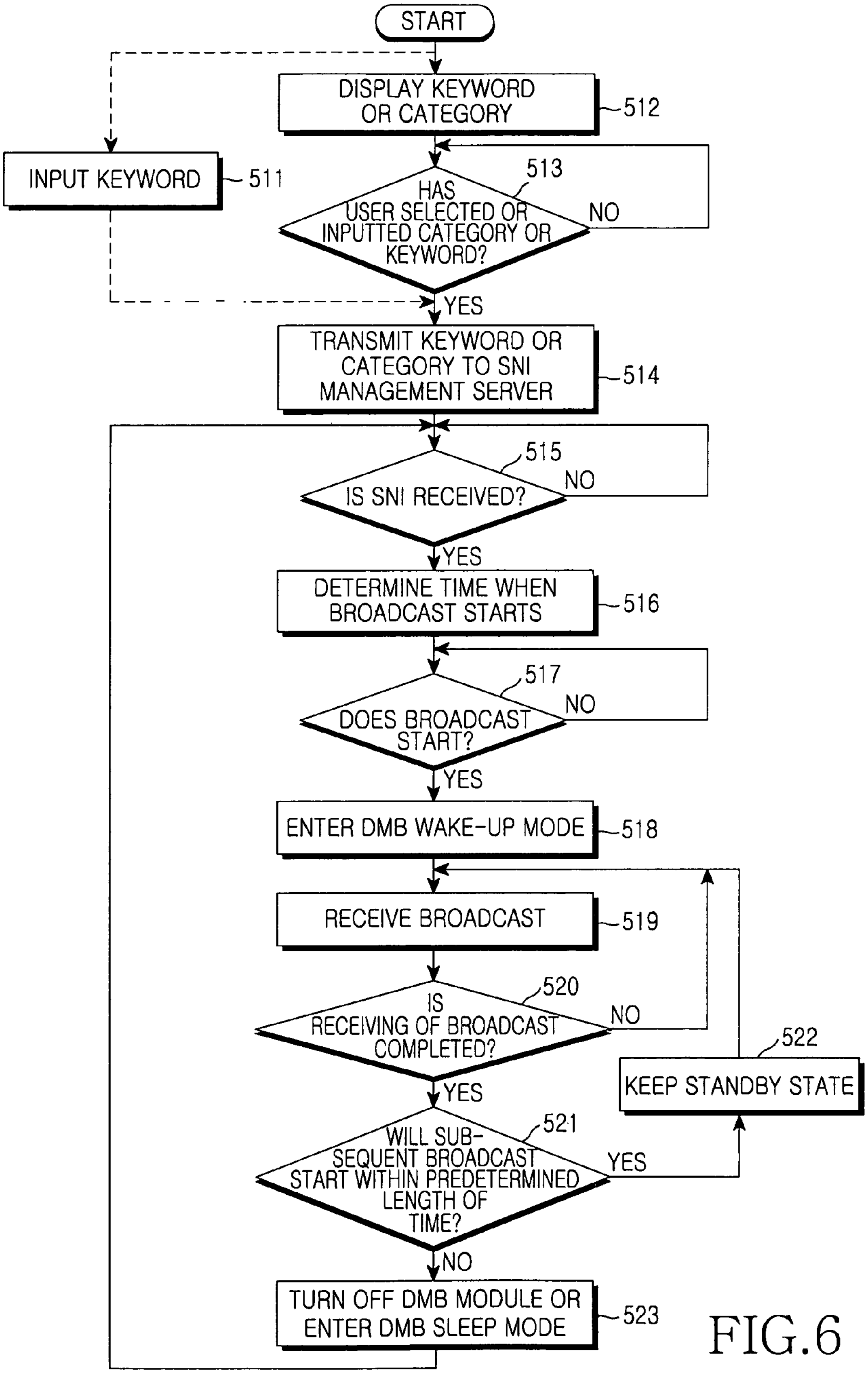
FIG. 6 is a flowchart illustrating a method of selectively receiving a DMB data broadcast according to an embodiment of the present invention.

FIG. 6 is a flowchart illustrating a method of selectively receiving a DMB data broadcast according to a preferred embodiment of the present invention.

Referring to FIG. 6, the mobile communication terminal 10 of FIG. 1 displays a category or a keyword of a DMB data broadcast (step 512). In this case, the category or the keyword may be read from an external database or may be obtained by accessing a wireless Internet portal site. Alternatively, a user may input a keyword to the mobile communication terminal 10 (step 511). Thus, FIG. 6 illustrates the operation of step 511 using a dotted line.

Next, when the user selects (or inputs) the category (or the keyword) (step 513), the mobile communication terminal 10 transmits the category (or the keyword) to the SNI management server 30 directly or via the wireless Internet server 20 (step 514).

Next, the mobile communication terminal 10 determines whether the SNI management server 30 receives SNI (step 515). If the SNI management server 30 receives the SNI, the mobile communication terminal 10 analyzes the SNI to determine the time when broadcasting of the DMB data broadcast starts (step 516). Next, the mobile communication terminal 10 determines whether the DMB data broadcast starts (step 517), and if so, enters a DMB wake-up mode (step 518) and receives the DMB data broadcast (step 519), when the DMB data broadcast starts.

Next, the mobile communication terminal 10 determines whether reception of the DMB data broadcast is completed (step 520), and if so, whether a subsequent DMB data broadcast will start within a predetermined length of time (step 521). If the subsequent DMB data broadcast will start within the predetermined length of time, the mobile communication terminal 10 goes into standby until the subsequent DMB data broadcast starts (step 522) and then returns to step 519.

If it is determined in step 521 that the subsequent DMB data broadcast will not start within the predetermined length of time, the mobile communication terminal 10 turns off the DMB module 122 or enters a DMB sleep mode (step 523) and then returns to step 515.

Various examples of the method of selectively receiving a DMB data broadcast according to the present invention will now be briefly described.

EXAMPLE 1

A user accesses the wireless Internet server 20 using a mobile phone, and selects "Traffic information" from among predetermined keywords to transmit a category corresponding to the "Traffic information" to the SNI management server 30. Next, SNI is periodically or non-periodically transmitted from the SNI management server 30 to the mobile phone. The mobile phone receiving the SNI enters the DMB wake-up mode right before a desired data broadcast is transmitted thereto.

EXAMPLE 2

When the user inputs a keyword "Urban bus" using a mobile phone, the keyword is transmitted to the SNI management server 30. The SNI management server 30 determines whether a desired service can be received from the SNI. This is because the input key word is arbitrarily determined, but not predetermined. When determining that an itemized service can be provided, the SNI management server 30 transmits SNI regarding the service. That the itemized service can be provided means that only information regarding the keyword "Urban bus," for example, can be extracted and provided from a "Traffic information" category of the categories of a DMB data broadcast. The mobile phone receiving the SNI enters the DMB wake-up mode right before a desired data broadcast is transmitted thereto.

EXAMPLE 3

A user selects a "Public transport information (PTI)" category from the categories of a DMB data broadcast, using a mobile phone, and the selected category is transmitted to the SNI management server 30. Then, the SNI management server 30 transmits SNI, which is to be transmitted together with the PTI, to the mobile phone. Thereafter, the mobile phone enters the DMB wake-up mode right before a broadcast providing the PTI starts.

In the above three examples, the mobile phone entering the wake-up mode enters the DMB sleep mode or turns off a DMB module after completing receiving necessary information. However, when the mobile phone has learned beforehand that it would receive subsequent SNI within a predetermined length of time, the mobile phone does not perform the above operations.

Figure 7:
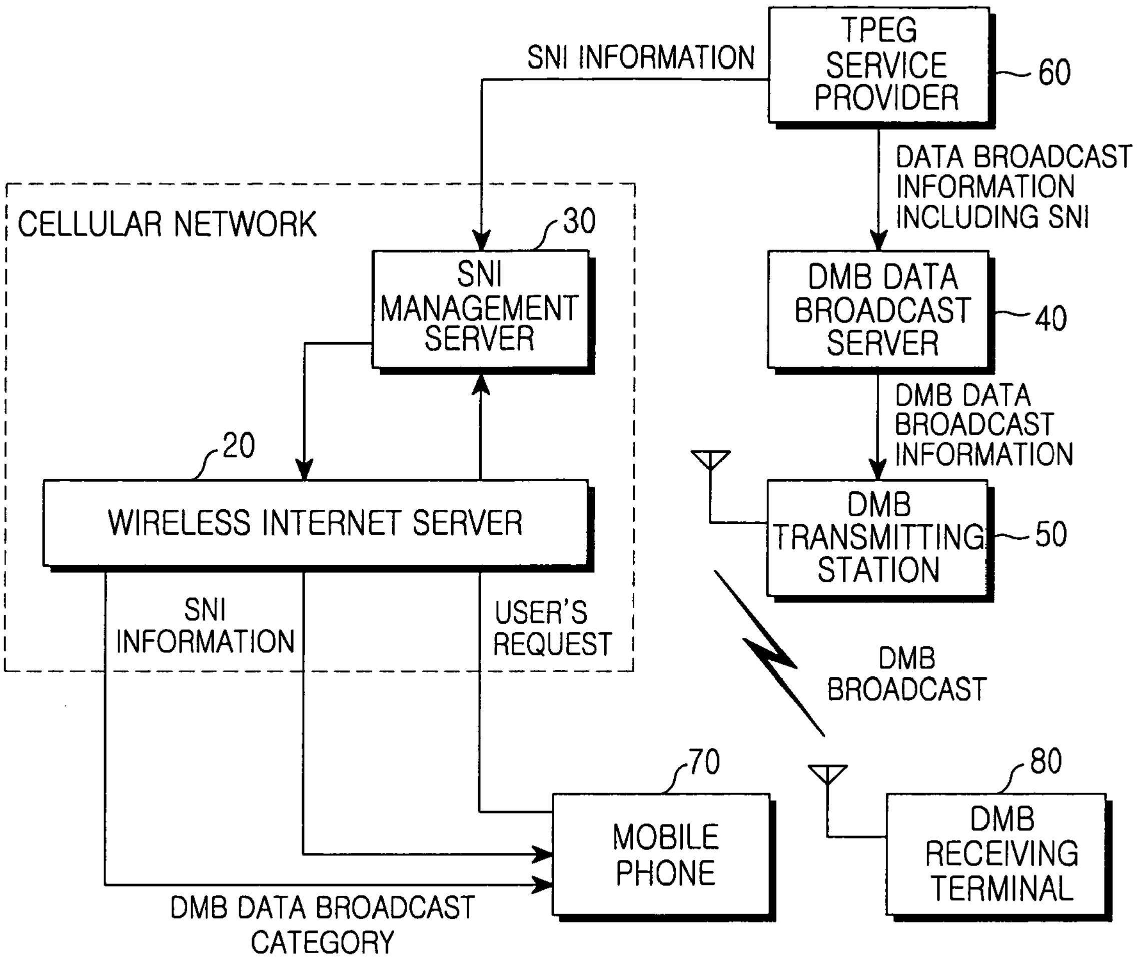
FIG. 7 is a block diagram illustrating a system for selectively receiving a DMB data broadcast according to another embodiment of the present invention.

FIG. 7 is a block diagram illustrating a system for selectively receiving a DMB data broadcast according to another preferred embodiment of the present invention.

A terminal may be manufactured to have a terrestrial DMB receiving part and a mobile phone part as illustrated in FIG. 1, but these parts may respectively be included in different terminals to establish communications between the different terminals referring to FIG. 7. Specifically, SNI is acquired via a cellular network using a mobile phone 70 to learn the time when a data broadcast starts a mobile phone 70. Then, when the data broadcast starts, a command to enter the wake-up mode to receive the data broadcast is transmitted to a DMB receiving terminal 80; or the DMB receiving terminal 80 is informed of the time when the data broadcast starts to enter the DMB wake-up mode to receive only a desired data broadcast via a DMB network, as soon as the time is learned. Alternatively, the SNI provided to the mobile phone 70 may be directly transmitted to the DMB receiving terminal 80 so that the DMB receiving terminal 80 can analyze the SNI.

As described above, according to the present invention, a cellular network and a terrestrial DMB network are combined to allow a mobile communication terminal to selectively receive a DMB data broadcast, thereby reducing unnecessary load and memory use in the mobile communication terminal, or power consumption.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A system for selectively receiving a Digital Multimedia Broadcasting (DMB) data broadcast, comprising:

a mobile communication terminal receiving the DMB data broadcast;

a Service Network Information (SNI) application management server transmitting SNI to the mobile communication terminal in response to a request from the mobile communication terminal;

a data broadcast server providing data broadcast information of the DMB data broadcast;

a DMB transmitting station transmitting the data broadcast information of the DMB data broadcast; and a Transport Protocol Experts Group (TPEG) service provider transmitting the SNI to the SNI application management server, and the data broadcast information including the SNI to the data broadcast server;

wherein the mobile communication terminal receives the SNI from the SNI application management server via a cellular network to determine the time when a desired service data broadcast starts, and receives a data broadcast from the DMB transmitting station only at the time.

2. The system as claimed in claim 1, further comprising a wireless Internet server providing a category of the DMB data broadcast to the mobile communication terminal.

3. The system as claimed in claim 2, wherein the mobile communication terminal requests the SNI application management server to directly provide information.

4. The system as claimed in claim 2, wherein the SNI application management server provides the mobile communication terminal with the SNI via the wireless Internet server.

5. The system as claimed in claim 1, wherein the mobile communication terminal analyzes the SNI to determine the time when the data broadcast starts, enters a sleep mode, and then enters a wake-up mode to receive the data broadcast if the data broadcast starts.

6. The system as claimed in claim 1, wherein the mobile communication terminal analyzes the SNI to determine the time when the data broadcast starts, turns off a DMB module, and then turns on the DMB module to receive the data broadcast if the data broadcast starts.

7. A system for selectively receiving a Digital Multimedia Broadcasting (DMB) data broadcast, comprising:

a first mobile communication terminal configured to access a cellular network;

second mobile communication terminal receiving the DMB data broadcast via a DMB network;

a wireless Internet server providing a DMB category to the first mobile communication terminal via the cellular network;

a Service Network Information (SNI) application management server transmitting SNI to the first mobile communication terminal in response to a request from the first mobile communication terminal;

a data broadcast server providing data broadcast information of the DMB data broadcast;

a DMB transmitting station transmitting the data broadcast information of the DMB data broadcast; and a Transport Protocol Experts Group (TPEG) service provider transmitting the SNI to the SNI application management server, and the data broadcast information including the SNI to the data broadcast server;

wherein the first mobile communication terminal communicates with the second mobile communication terminal regarding the received SNI, and the second mobile communication terminal receives the DMB data broadcast only at the time when the data broadcast starts, according to the communication result.

8. The system as claimed in claim 7, wherein during communication between the first and second mobile communication terminals, the first mobile communication terminal transmits the received SNI to the second mobile communication terminal; and the second mobile communication terminal analyzes the SNI to learn the time when the DMB data broadcast starts, and receives the DMB data broadcast only at the time.

9. The system as claimed in claim 7, wherein during communication between the first and second mobile communication terminals, the first mobile communication terminal analyzes the SNI to learn when the DMB data broadcast starts, and transmits the analysis result to the second mobile communication terminal.

10. The system as claimed in claim 7, wherein during communication between the first and second mobile communication terminals, the first mobile communication terminal analyzes the SNI to learn when the DMB data broadcast starts, and enters a wake-up mode to transmit to the second mobile communication terminal a command to receive the DMB data broadcast when the DMB data broadcast starts.

* * * * *